United States Patent
Gannamaneni et al.

(10) Patent No.: US 12,283,831 B2
(45) Date of Patent: Apr. 22, 2025

(54) ON-BOARD CHARGER AND DC-DC CONVERTER ARCHITECTURE FOR BALANCING OF VOLTAGES OR CURRENTS BETWEEN BATTERIES IN ELECTRIC VEHICLE BATTERY SYSTEMS

(71) Applicant: Volvo Car Corporation, Gothenburg (SE)

(72) Inventors: Narendar Rao Gannamaneni, Gothenburg (SE); Ali Dareini, Gothenburg (SE); Lars Johan Henrik Sjöstedt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 450 days.

(21) Appl. No.: 17/585,067

(22) Filed: Jan. 26, 2022

(65) Prior Publication Data

US 2022/0278529 A1 Sep. 1, 2022

Related U.S. Application Data

(60) Provisional application No. 63/155,028, filed on Mar. 1, 2021.

(51) Int. Cl.
*H02J 7/00* (2006.01)
*B60L 53/20* (2019.01)
(Continued)

(52) U.S. Cl.
CPC ............ *H02J 7/0014* (2013.01); *B60L 53/20* (2019.02); *B60L 53/22* (2019.02); *B60L 58/22* (2019.02); *H02J 3/322* (2020.01); *H02J 2310/48* (2020.01)

(58) Field of Classification Search
CPC ...... H02J 7/0014; H02J 3/322; H02J 2310/48; B60L 53/20; B60L 53/22; B60L 58/22
(Continued)

(56) References Cited

U.S. PATENT DOCUMENTS

| 8,779,700 B1* | 7/2014 | Prodic ............... H02M 3/33584 318/812 |
| 2008/0018305 A1* | 1/2008 | Altemose ............. H02J 7/0048 320/134 |

(Continued)

FOREIGN PATENT DOCUMENTS

| CN | 101164215 A | 4/2008 |
| CN | 102823104 A | 12/2012 |

(Continued)

OTHER PUBLICATIONS

Communications Pursuant to rule 71(3) EPC received for European Patent Application Serial No. 22159434.4 dated Aug. 16, 2023, 47 pages.

(Continued)

*Primary Examiner* — Richard Isla
*Assistant Examiner* — Manuel Hernandez
(74) *Attorney, Agent, or Firm* — Amin, Turocy & Watson, LLP

(57) ABSTRACT

An electric vehicle battery system is provided. In some embodiments, the electric vehicle battery system can comprise a battery pack comprising a first battery and a second battery. In various embodiments, a first bidirectional direct current to alternating current (DC-AC) converter can be electrically coupled to the first battery and to a first bidirectional high-voltage (HV) alternating current to direct current (AC-DC) converter. In various implementations, a second bidirectional DC-AC converter can be coupled to the second battery and to a second bidirectional HV AC-DC converter.

(Continued)

In further embodiments, and a power factor correction AC-DC module can be electrically coupled to the first bidirectional HV AC-DC converter via a first switch and the second bidirectional HV AC-DC converter via a second switch.

20 Claims, 10 Drawing Sheets

(51) Int. Cl.
  *B60L 53/22* (2019.01)
  *B60L 58/22* (2019.01)
  *H02J 3/32* (2006.01)
(58) Field of Classification Search
  USPC .................................. 320/116, 118, 119, 137
  See application file for complete search history.

(56) References Cited

U.S. PATENT DOCUMENTS

| | | | |
|---|---|---|---|
| 2010/0141213 A1 | 6/2010 | Iida | |
| 2011/0309796 A1* | 12/2011 | Firehammer | H02J 7/0018 320/118 |
| 2012/0049794 A1* | 3/2012 | Han | B60L 58/20 320/109 |
| 2013/0181680 A1* | 7/2013 | Chau | B60L 58/10 320/134 |
| 2014/0035531 A1* | 2/2014 | Garnier | H02J 7/342 320/118 |
| 2014/0210419 A1 | 7/2014 | Kim | |
| 2014/0354212 A1* | 12/2014 | Sugeno | H02J 7/0019 320/136 |
| 2015/0306973 A1* | 10/2015 | Gunnerud | B60L 53/20 320/162 |
| 2015/0357843 A1* | 12/2015 | Kobayashi | H02J 7/0016 320/118 |
| 2017/0353042 A1* | 12/2017 | Liu | H01M 10/4257 |
| 2017/0373520 A1* | 12/2017 | Sugeno | H01M 10/441 |
| 2018/0272879 A1* | 9/2018 | Lasagni | H02J 7/1423 |
| 2019/0023149 A1 | 1/2019 | Chen et al. | |
| 2019/0148973 A1* | 5/2019 | Kim | H02J 7/06 320/109 |
| 2019/0168632 A1 | 6/2019 | Deng et al. | |
| 2020/0059106 A1* | 2/2020 | Karlsson | H01M 10/425 |
| 2020/0169097 A1* | 5/2020 | Zhang | H02J 7/0014 |
| 2020/0212817 A1* | 7/2020 | Sun | H02M 1/083 |
| 2020/0412237 A1* | 12/2020 | Dai | H02M 3/155 |
| 2021/0184481 A1* | 6/2021 | Kobayashi | H01M 10/441 |
| 2022/0102986 A1* | 3/2022 | Sahoo | H02J 7/0014 |
| 2022/0194238 A1* | 6/2022 | Jang | B60L 58/12 |
| 2022/0212548 A1* | 7/2022 | Yin | H02M 3/33584 |
| 2023/0134008 A1* | 5/2023 | Jabez Dhinagar | H02J 7/0013 320/107 |
| 2023/0223840 A1* | 7/2023 | Zhu | H02M 7/86 363/84 |
| 2024/0067046 A1* | 2/2024 | Mu | B60L 58/22 |
| 2024/0235378 A1* | 7/2024 | Hou | H02H 9/041 |

FOREIGN PATENT DOCUMENTS

| | | | |
|---|---|---|---|
| CN | 107696863 A | 2/2018 | |
| CN | 111264014 A | 6/2020 | |
| WO | WO-2019082776 A1 * | 5/2019 | ............... B60L 3/00 |

OTHER PUBLICATIONS

Extended European Search Report received for European Patent Application Serial No. 22159434.4 dated Aug. 3, 2022, 7 pages.
Communications Pursuant to rule 69 EPC received for European Patent Application Serial No. 22159434.4 dated Sep. 12, 2022, 2 pages.
Extended EP Search Report for EP Application No. 24150815.9 dated Jun. 25, 2024.
First office action received for Chinese Patent Application Serial No. 202210193219.2 dated Jan. 3, 2025, 22 pages (Including English Translation).

* cited by examiner

ON-BOARD CHARGER AND DC-DC CONVERTER ARCHITECTURE FOR BALANCING OF VOLTAGES OR CURRENTS BETWEEN BATTERIES IN ELECTRIC VEHICLE BATTERY SYSTEMS

CROSS-REFERENCE TO RELATED APPLICATION

This application claims priority to U.S. Provisional Patent Application No. 63/155,028, filed on Mar. 1, 2021, and entitled "BALANCING OF HIGH-VOLTAGE BATTERY SYSTEMS THROUGH INTEGRATED ON-BOARD CHARGERS AND DC-DC CONVERTERS," the entirety of which application is hereby incorporated by reference herein.

TECHNICAL FIELD

The disclosed subject matter relates to electric vehicle battery systems, and more particularly, to balancing of voltages or currents between batteries in electric vehicle battery systems.

BACKGROUND

Electric vehicles are becoming increasingly prevalent worldwide, and are poised to become one of the most common modes of transportation. With this pivot in transportation technology, there exist increasing power demands on batteries or battery packs of electric vehicles. With this increased power demand, sizes of conventional power conversion modules or components, such as on-board chargers, direct-current to direct-current (DC-DC) converters, and traction inverters are growing, which present significant packaging and integration challenges in electric vehicles.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. As described, there exists a need for a battery system that balances high voltage batteries without external balancing circuits, and various embodiments are described herein to this end and/or other ends.

According to an embodiment, an electric vehicle battery system can comprise: a battery pack comprising a first battery and a second battery; a first bidirectional direct current to alternating current (DC-AC) converter electrically coupled to the first battery and to a first bidirectional high-voltage (HV) alternating current to direct current (AC-DC) converter; a second bidirectional DC-AC converter coupled to the second battery and to a second bidirectional HV AC-DC converter; and a power factor correction AC-DC module electrically coupled to: the first bidirectional HV AC-DC converter via a first switch; and the second bidirectional HV AC-DC converter via a second switch.

According to another embodiment, an electric vehicle battery system can comprise: a battery pack comprising a first battery and a second battery; a first bidirectional direct current to alternating current (DC-AC) converter electrically coupled to the first battery and to a first bidirectional high-voltage (HV) alternating current to direct current (AC-DC) converter; a second bidirectional DC-AC converter coupled to the second battery and to a second bidirectional HV AC-DC converter; a first power factor correction (PFC) AC-DC module electrically coupled to the first bidirectional HV AC-DC converter; and a second PFC AC-DC module electrically coupled to the second bidirectional HV AC-DC converter.

According to an additional embodiment, a method can comprise: determining, by a system comprising a processor: a first voltage of a first battery of a battery pack of an electric vehicle; and a second voltage of a second battery of the battery pack; and in response to determining, by the system, that the first voltage is different from the second voltage, balancing, by the system, using one or more power factor correction alternating current to direct current modules, two or more bidirectional direct current to alternating current converters, and two or more bidirectional high-voltage alternating current to direct current converters, the first voltage of the first battery and the second voltage of the second battery.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
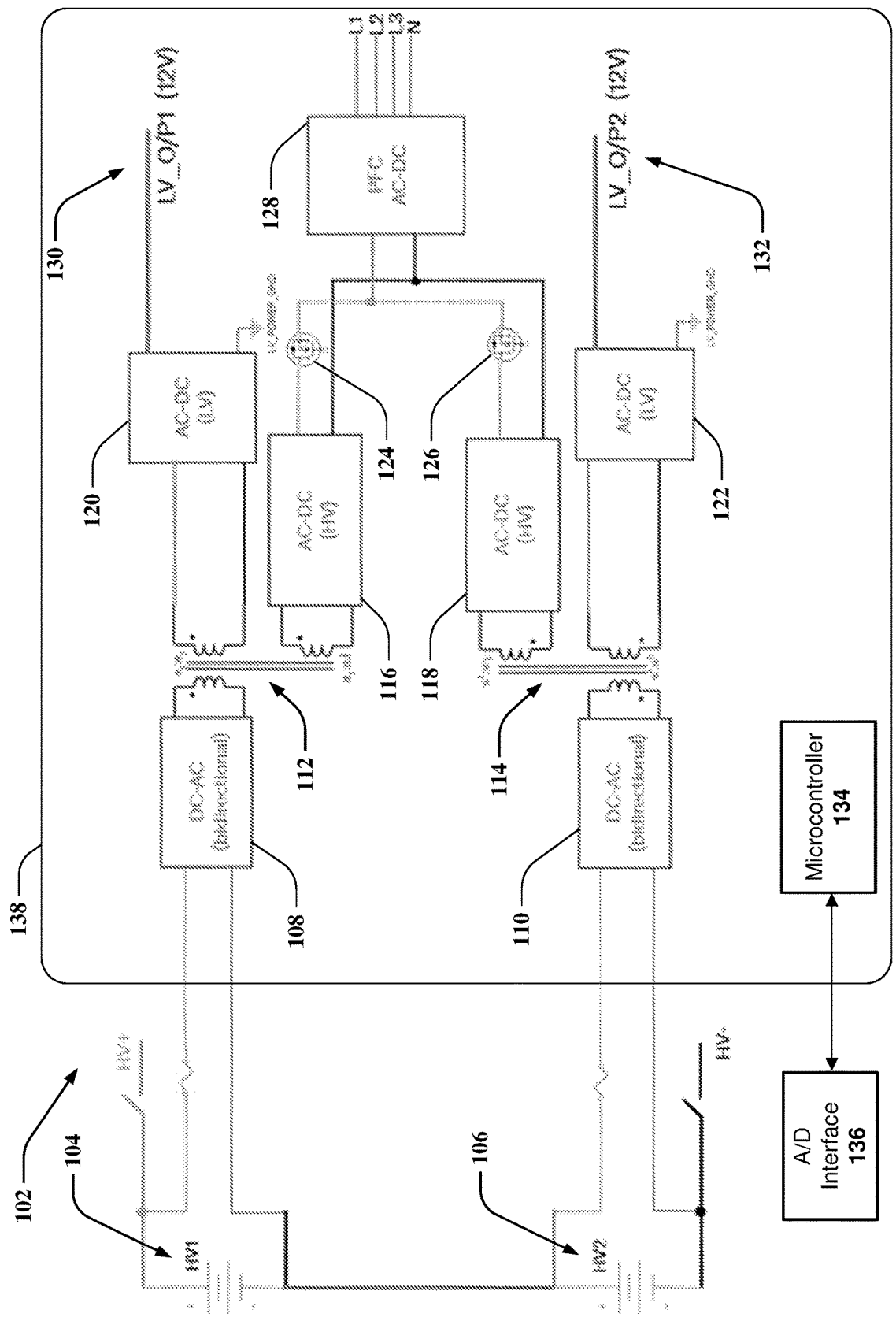
FIG. 1 illustrates a block diagram of an example, non-limiting split battery balancing system in accordance with one or more embodiments described herein.

FIG. 1 illustrates a block diagram of an example, non-limiting split battery balancing system 102 in accordance with one or more embodiments described herein. In various embodiments, the split battery balancing system 102 can comprise an on-board charger and DC-DC converter architecture. In some embodiments, the on-board charger and DC-DC converter architecture can be integrated into a single integrated circuit. The split battery balancing system 102 can comprise a high-voltage (HV) battery HV1 104, a high-voltage battery HV2 106, a bidirectional DC-AC converter 108, a bidirectional DC-AC converter 110, a transformer 112, a transformer 114, a bidirectional HV AC-DC converter 116, a bidirectional HV AC-DC converter 118, a bidirectional low-voltage (LV) AC-DC converter 120, a bidirectional LV AC-DC converter 122, a semiconductor switch 124, a semiconductor switch 126, a power factor correction (PFC) AC-DC module 128, an LV output 130, and/or an LV output 132.

A vehicle on-board charging system (e.g., a split battery balancing system 102) can convert AC power to DC power or AC current to DC current in order to charge an HV battery or HV battery pack (e.g., 400V or 800V) inside an electric vehicle. For example, a PFC AC-DC module 128 can utilize a passive filter or switching converter to modulate a distorted AC wave and shape the AC wave into a sine wave and convert the AC wave into DC power. According to an embodiment, the PFC AC-DC module 128 can convert AC power to DC power or AC current to DC current, which can be further supplied to the bidirectional HV AC-DC converter 116 or the bidirectional HV AC-DC converter 118. In various embodiments, the bidirectional HV AC-DC converters 116 or 118 can receive DC output from the PFC AC-DC module 128 and convert the DC into high-frequency AC. In various implementations, high-frequency AC power from the bidirectional HV AC-DC converters 116 or 118 can be supplied to the bidirectional DC-AC converters 108 and 110 through the transformers 112 and 114, respectively. In this regard, the bidirectional DC-AC converters 108 or 110 can be utilized to charge the HV batteries (e.g., HV1 and HV2) individually.

It is noted that an HV battery pack can comprise HV1 104 and HV2 106. In further implementations, HV1 104 and HV2 106 can comprise separate battery packs. A DC-DC converter (e.g., comprising components of the split battery balancing system 102, such as bidirectional DC-AC converter 108 and bidirectional LV AC-DC converter 120 or bidirectional DC-AC converter 110 and bidirectional LV AC-DC converter 122) can provide power to the LV loads (e.g., LV output 130 and/or LV output 132) (e.g., at 12V or 48V, or another suitable voltage) inside the vehicle or to vehicle accessories, such as communication systems, battery temperature management systems such as heaters, or to other LV or medium voltage (MV) components or accessories of an electric or hybrid vehicle. For example, the bidirectional DC-AC converter 108 can convert DC power or voltage from HV1 104 to AC power or voltage, and the bidirectional LV AC-DC converter 120 can convert the AC power or voltage from the bidirectional DC-AC converter 108 to a LV. With increasing safety criterion (e.g., up to Automotive Safety Integrity Level (ASIL) C or ASIL D) for power converters, especially DC-DC converters, in addition to the integration of on-board chargers (e.g., AC-DC), benefits such as reduced packaging volume and cost can be realized by removing dedicated balancing circuits. In order achieve such benefits, a DC-DC converter can be implemented directly across HV battery pack(s). To satisfy ASIL C or ASIL D, a DC-DC converter can be split into two power conversion modules (e.g., bidirectional DC-AC converter 108 and bidirectional LV AC-DC converter 120, and bidirectional DC-AC converter 110 and bidirectional LV AC-DC converter 122), connected across each half of a battery pack (e.g., as shown in FIG. 1). In this regard, a battery pack can be split into an HV1 104 and HV2 106, which can enable redundancy (e.g., in the event of a failure of HV1 104 or HV2 106), and help supply a plurality of LV loads. It is noted that in additional embodiments, HV1 104 and HV2 106 can comprise components of a single battery pack, or can comprise separate battery packs.

The PFC AC-DC module 128 can convert an input of AC power or AC current (e.g., from a grid or charging station) into DC power or DC current. In this regard, a non-isolated DC output (e.g., with no transformer) can be split into two halves for each side (e.g., HV1 104 side and HV2 106 side). In various embodiments, the PFC AC-DC module 128 can comprise a phase-changing mechanism, which can comprise phase-changing relays (e.g., for phases L1, L2, and L3) and can be connected to a neutral circuit (N). In various implementations, the three phases (phases L1, L2, and L3) can be connected to a single phase. In various embodiments, the foregoing can be utilized in split phase applications in addition to 120V, 220V, or with other suitable voltages. In various embodiments, such a phase-changing mechanism can comprise a three-phase or single-phase mechanism, though other quantities or combinations of phases can be utilized (e.g., depending on country and/or voltages at charging stations). It is noted that the transformer 112 or transformer 114 can comprise galvanic couplings which can provide galvanic isolation within the split battery balancing system 102 and can physically separate ground wires between HV and LV circuits.

Conventionally, during driving, a bidirectional HV AC-DC converter would be dormant. In a split battery balancing system, however, without load balancing between LV outputs 130 and 132, imbalance between an HV1 104 and HV2 106 can result (e.g., from differing loads on HV1 104 and HV2 106 via LV output 130 and LV output 132, respectively). This imbalance can result in reduced life of a battery pack comprising HV1 104 and HV2 106. Therefore, embodiments herein facilitate load balancing, which can improve longevity of battery packs described herein.

It is noted that the split battery balancing system 102 can comprise a control section 138, which can comprise a controller (e.g., microcontroller 134). In one or more embodiments, the microcontroller 134 herein can communicate over an analog and digital (A/D) interface 136 (e.g., with an electric vehicle or other suitable components or external components). The split battery balancing system 102 and/or microcontroller 134 can comprise a memory, which can store one or more computer/machine readable and/or executable components and/or instructions that, when executed by a processor (e.g., a classical processor, a quantum processor, etc.), can facilitate performance of operations defined by the executable component(s) and/or instruction(s). The memory can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. The split battery balancing system 102 and/or microcontroller 134 can comprise a processor which can comprise one or more types of processors and/or electronic circuitry (e.g., a classical processor, graphics processor, a quantum processor, etc.) that can implement one or more computer and/or machine readable, writable, and/or executable components and/or instructions that can be stored on a memory. For example, the processor can perform various operations that can be specified by such computer and/or machine readable, writable, and/or executable components and/or instructions including, but not limited to, logic, control, input/output (I/O), arithmetic, and/or the like. In some embodiments, processors herein can comprise one or more central processing unit, multi-core processor, microprocessor, dual microprocessors, microcontroller, System on a Chip (SOC), array processor, vector processor, quantum processor, and/or another type of processor.

In various embodiments, one or more of the HV1 104, HV2 106, bidirectional DC-AC converter 108, bidirectional DC-AC converter 110, transformer 112, transformer 114, bidirectional HV AC-DC converter 116, bidirectional HV AC-DC converter 118, bidirectional LV AC-DC converter 120, bidirectional LV AC-DC converter 122, semiconductor switch 124, semiconductor switch 126, PFC AC-DC module 128, LV output 130, and/or an LV output 132 can be communicatively or operably coupled to one another to perform one or more functions of the split battery balancing system 102.

Figure 2:
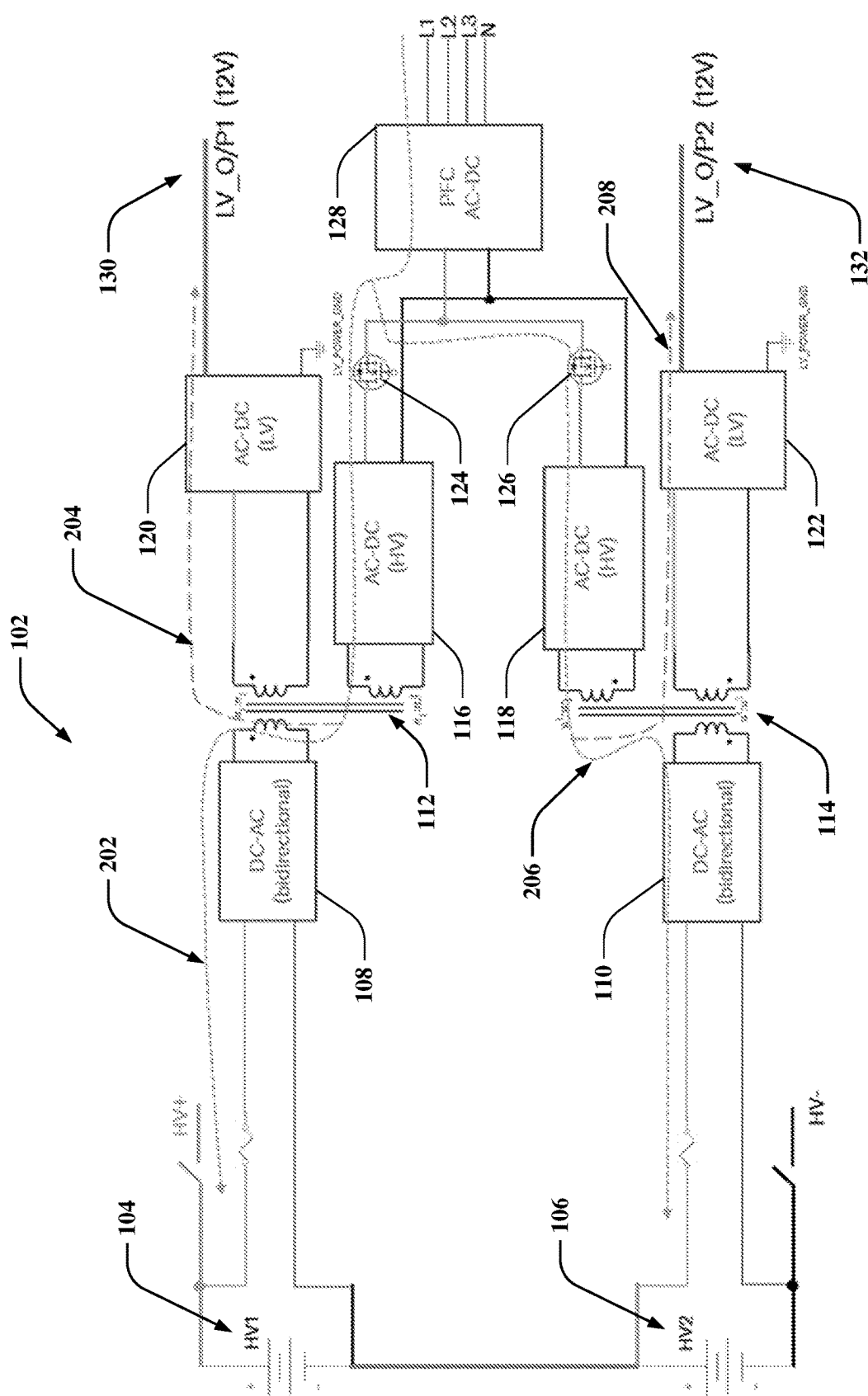
FIG. 2 illustrates a block diagram of an example, non-limiting split battery balancing system in accordance with one or more embodiments described herein.

FIG. 2 illustrates a block diagram of an example, non-limiting split battery balancing system 102 in accordance with one or more embodiments described herein. In this regard, FIG. 2 illustrates power flow during charging with an on-board charger and DC-DC converter architecture. Here, power flow paths during charging of HV1 104 and HV2 106, as utilized in the split battery balancing system 102, can be realized. Power flow paths 202 and 206 can represent power flow to HV1 104 and HV2 106 from AC input (e.g., from L1, L2, L3, N). Additionally, flow paths 204 and 208 can represent power flow to LV output 130 and LV output 132 from AC input.

According to an embodiment, the PFC AC-DC module 128 can convert AC power to DC power or AC current to DC current, which can be further supplied to the bidirectional HV AC-DC converter 116 or the bidirectional HV AC-DC converter 118. In various embodiments, the bidirectional HV AC-DC converters 116 or 118 can receive DC output from the PFC AC-DC module 128 and convert the DC into high-frequency AC. In various implementations, high-frequency AC power from the bidirectional HV AC-DC converters 116 or 118 can be supplied to the bidirectional DC-AC converters 108 and 110 through the transformers 112 and 114, respectively. In this regard, the bidirectional DC-AC converters 108 or 110 can be utilized to charge the HV batteries (e.g., HV1 and HV2) individually. According to an embodiment, high-frequency AC power from the bidirectional HV AC-DC converters 116 or 118 can be supplied to the bidirectional LV AC-DC converters 120 or 122 in order to provide power to LV loads (e.g., LV output 130 and/or LV output 132). In various embodiments, the transformers can utilize fixed scaling, and can comprise at least two windings with a fixed turns ratio. In this regard, $n_1$ (e.g., of the transformer 112 or transformer 114) can comprise a quantity of turns in a respective first winding, $n_2$ can comprise a quantity of turns in a second winding, and $n_3$ can comprise a quantity of turns in a third winding. In various implementations, an $n_1:n_2$ ratio can be approximately 1:1 or 1:2. In further implementations, an $n_1:n_3$ ratio can be approximately 15:1. Because turns ratios can be fixed, respective duty cycles can be adjusted (e.g., as instructed by the microcontroller 134) to adjust voltages.

Figure 3:
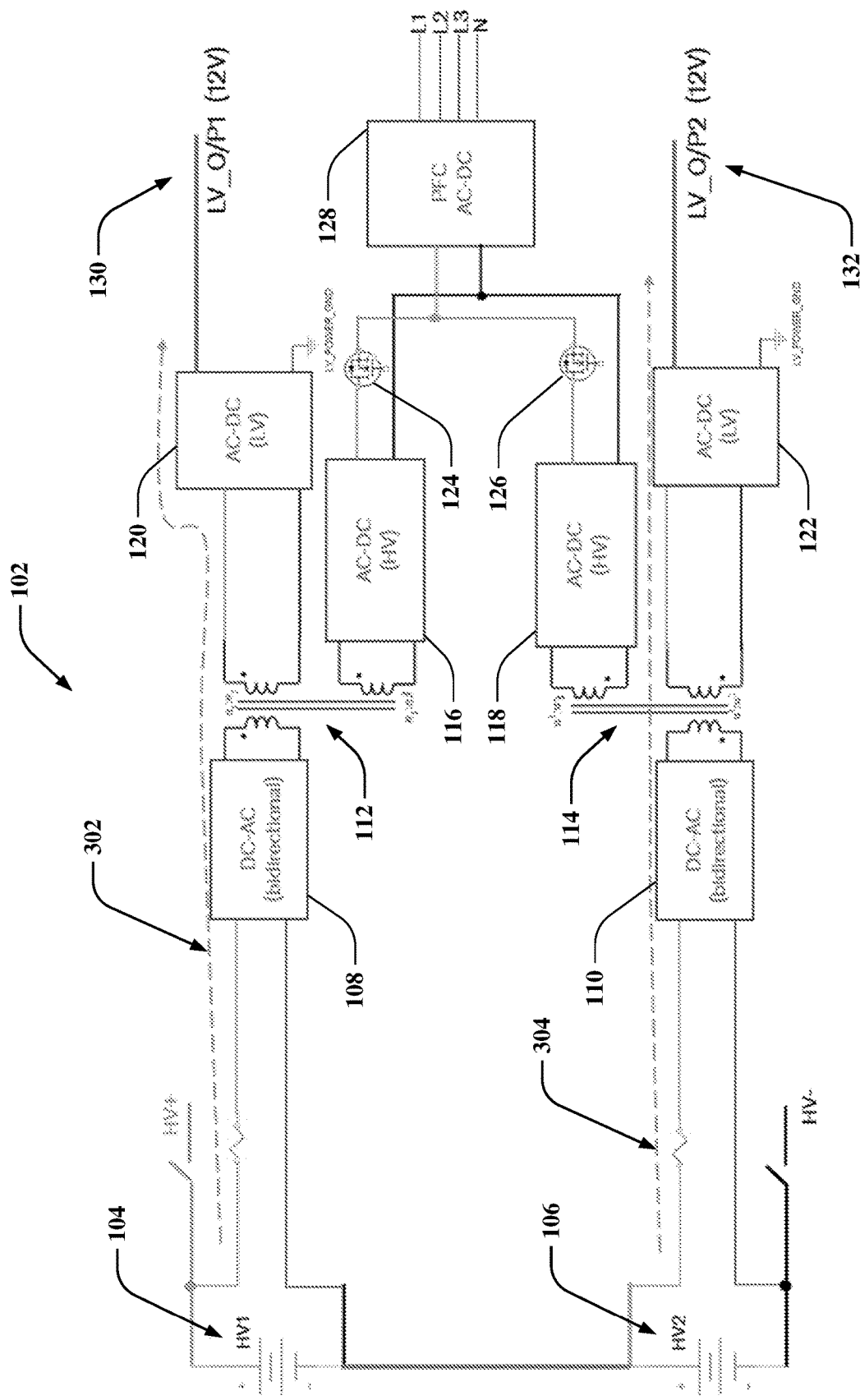
FIG. 3 illustrates a block diagram of an example, non-limiting split battery balancing system in accordance with one or more embodiments described herein.

FIG. 3 illustrates a block diagram of an example, non-limiting split battery balancing system 102 in accordance with one or more embodiments described herein. In this regard, FIG. 3 illustrates power flow during driving with an on-board charger and DC-DC converter architecture. During driving of an electric vehicle (e.g., an electric vehicle comprising the split battery balancing system 102), the PFC AC-DC module 128 can be inactive, and the semiconductor switches 124 and 126 (e.g., on the output side of the PFC AC-DC module 128) can be turned OFF (e.g., by the microcontroller 134) (e.g., in order to avoid a common connection for transferring power to LV loads, such as LV outputs 130 and 132) (e.g., to satisfy ASIL C or ASIL D criterion). In FIG. 3, power flow paths (e.g., during driving) 302 and 304 are illustrated. In this regard, power can flow from HV1 104 to LV output 130 along flow path 302. For example, the bidirectional DC-AC converter 108 can convert DC power or voltage from HV1 104 to AC power or voltage, and the bidirectional LV AC-DC converter 120 can convert the AC power or voltage from the bidirectional DC-AC converter 108 to a LV. Likewise, power can flow generally from HV2 106 to LV output 132 along flow path 304. For example, the bidirectional DC-AC converter 110 can convert DC power or voltage from HV2 106 to AC power or voltage, and the bidirectional LV AC-DC converter 122 can convert the AC power or voltage from the bidirectional DC-AC converter 110 to a LV. Without such balancing, due to independent power consumptions on LV outputs 130 and 132, unequal power could flow from the two split batteries (e.g., HV1 104 and HV2 106). This can cause imbalance between two series of batteries (e.g., series connected batteries) HV1 104 and HV2 106, which can become worsened if the difference in LV power outputs (e.g., between LV output 130 and LV output 132) is larger. Therefore, balancing as discussed above can be implemented in order to reduce such an imbalance.

Figure 4:
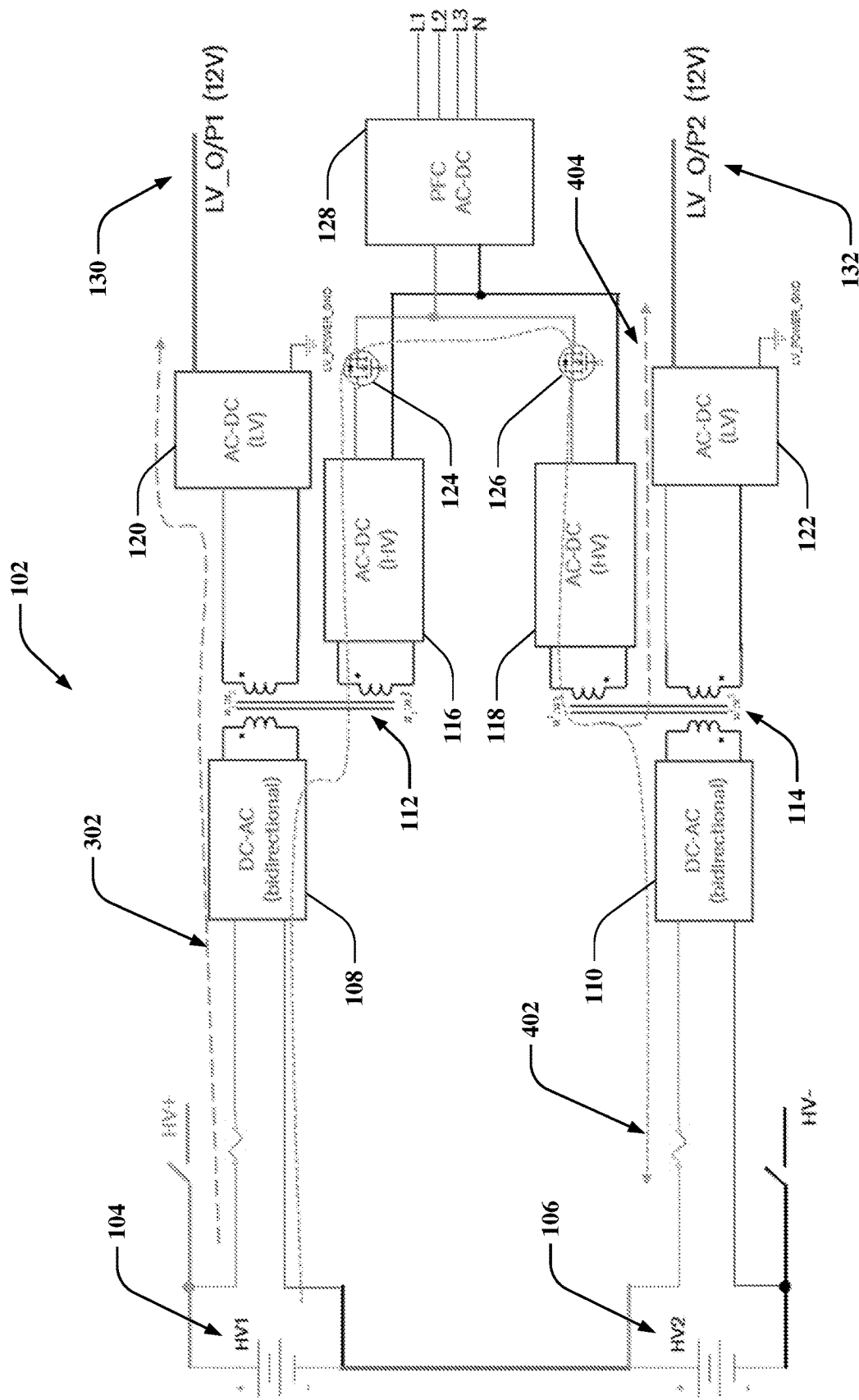
FIG. 4 illustrates a block diagram of an example, non-limiting split battery balancing system in accordance with one or more embodiments described herein.

FIG. 4 illustrates a block diagram of an example, non-limiting split battery balancing system 102 in accordance with one or more embodiments described herein. In this regard, FIG. 4 illustrates the use of the charging system of an electric vehicle, such as the PFC AC-DC module 128, semiconductor switches 124 and 126, and bidirectional HV AC-DC converters 116 and 118. However, instead of using the charging system to charge from a power source (e.g., a power grid, a wall outlet, a charging station, or another suitable power source), the charging system can balance a charge or an output of a split battery balancing system 102 (e.g., during driving of an electric vehicle) (e.g., to remedy an imbalance as discussed above with respect to FIG. 3). In this regard, implementation of additional hardware can be avoided. In various embodiments, if HV1 104 comprises a higher voltage than HV2 106, power flow paths (e.g., as illustrated in FIG. 4) can be utilized (e.g., by opening or closing one or more switches herein using the microcontroller 134) in order to balance HV1 and HV2 voltages or charge levels. In various embodiments, if during driving, HV1 104 is charged more than HV2 106, power can flow along flow path 402 to balance HV1 104 and HV2 106 voltages or charge levels. To accomplish the foregoing, semiconductor switches 124 and 126 (e.g., metal-oxide-semiconductor field-effect transistor "MOSFET" or insulated-gate bipolar transistor "IGBT") can be opened or closed. For example, AC power from the bidirectional DC-AC converter 108, as connected to HV1 104, can flow through transformer 112, through the charging system (e.g., bidirectional HV AC-DC converter 116, semiconductor switches 124 and 126 in closed positions, bidirectional HV AC-DC converter 118), transformer 114, and bidirectional DC-AC converter 110 into the battery HV2 106. In this regard, HV2 106 can charge from HV1 104, and if there is a load at LV output 132, some of the power from bidirectional HV AC-DC converter 118 can also flow from the transformer 114 to the bidirectional LV AC-DC converter 122 and output as 12V or 48V (or at another suitable voltage). In various embodiments, the aforementioned balancing can continue until HV1 104 and HV2 106 comprise equal or approximately equal charges or voltages (e.g., within a defined difference of charge or voltage). Similarly, HV1 104 can be charged from HV2 106, and LV output 130 can be supplied by HV2 106.

In various embodiments, if balancing between HV1 104 and HV2 106 is needed (e.g., due to unequal voltages or states of charge as a result of unequal draws, or other factors such as damage to one of HV1 104 or HV2 106), current flow can be stopped from HV1 104 or HV2 106 (e.g., as directed by microcontroller 134 or tripped by circuitry when a threshold voltage is detected or experienced). For example, the microcontroller 134 can stop electrically disconnect HV1 104 or HV2 106 from a respective bidirectional DC-AC converters 108 or 110. In one or more embodiments, the microcontroller 134 can determine energy levels or voltage states of HV1 104 or HV2 106 (e.g., using a voltmeter or ammeter of the HV1 104 or HV2 106 or of another suitable component of the split battery balancing system 102). In response to determining that an imbalance between HV1 104 and HV2 106 exists, the microcontroller 134 can generate and send signal(s) to one or more AC-DC stages, transformers, semiconductor switches, or modules, to control energy flow herein. It is noted that such a microcontroller 134 can control or direct any component of the split battery balancing system 102. It is further noted that any battery system herein (e.g., split battery balancing system 102, split battery balancing system 502, split battery balancing system 602, or other suitable battery systems) can comprise and/or be communicatively coupled to the microcontroller 134 and/or A/D interface 136, though the microcontroller 134 and/or A/D interface 136 are omitted in one or more figures herein for sake of brevity. In further embodiments, a threshold imbalance between HV1 104 and HV2 106 can trip a circuit (e.g., without utilizing the microcontroller 134), which can cause the one or more AC-DC stages, transformers, semiconductor switches, or modules, to control energy flow herein.

Figure 5:
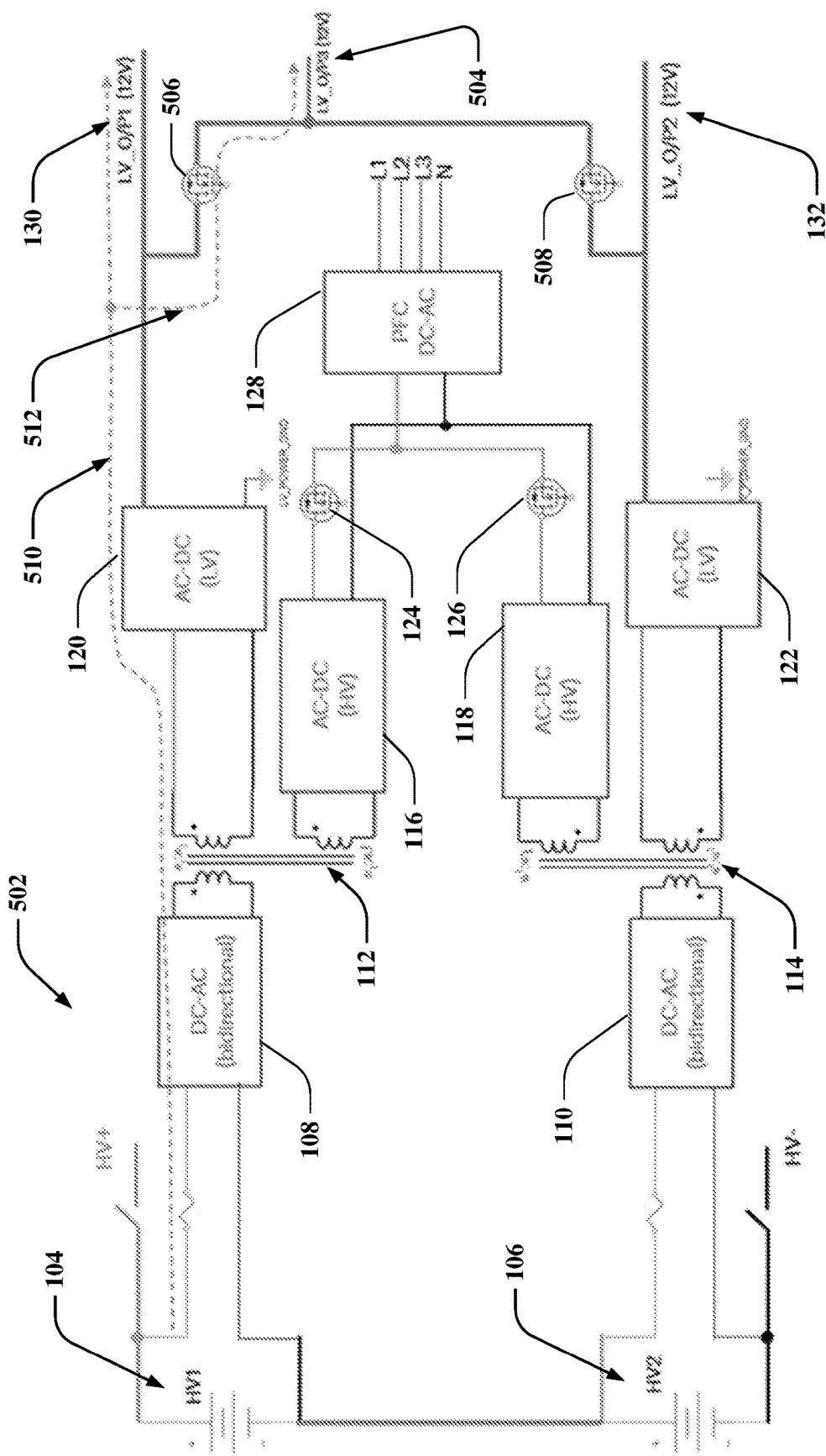
FIG. 5 illustrates a block diagram of an example, non-limiting split battery balancing system in accordance with one or more embodiments described herein.

FIG. 5 illustrates a block diagram of an example, non-limiting split battery balancing system 502 in accordance with one or more embodiments described herein. In various embodiments, the split battery balancing system 502 can comprise an on-board charger and DC-DC converter architecture. The split battery balancing system 502 can comprise battery HV1 104, battery HV2 106, bidirectional DC-AC converter 108, bidirectional DC-AC converter 110, transformer 112, transformer 114, bidirectional HV AC-DC converter 116, bidirectional HV AC-DC converter 118, bidirectional LV AC-DC converter 120, bidirectional LV AC-DC converter 122, semiconductor switch 124, semiconductor switch 126, PFC AC-DC module 128, LV output 130, and/or LV output 132. Repetitive description of like elements and/or processes employed in respective embodiments is omitted for sake of brevity. The split battery balancing system 502 can additionally comprise LV output 504, semiconductor switch 506 (e.g., a MOSFET or IGBT), and/or semiconductor switch 508 (e.g., a MOSFET or IGBT).

According to an embodiment, an additional LV output (LV output 132) can be added by combining both LV output 130 and LV output 132. According to an example, if the HV1 104 and HV2 106 voltages are equal, the output voltages of LV output 130 and LV output 132 are also equal, then the LV output 504 power can be shared between HV1 104 and HV2 106 batteries equally. In this regard, the semiconductor switches 506 and 508 can be opened or closed in order to enable such shared power flow. In another example, if HV1 104 voltage is higher than HV2 106, the LV output 130 voltage can be increased to be higher than LV output 132 voltage so that LV output 504 power demand is supplied by only HV1 104 (e.g., along flow paths 510 and 512). In this regard, semiconductor switch 506 can be closed (e.g., to permit power flow) and semiconductor switch 508 can be opened (e.g., to restrict power flow). In various embodiments, the foregoing can be continued until HV1 104 voltage is equal to HV2 106 voltage. A similar operation can be performed if HV2 106 voltage is higher than HV1 104 voltage. The foregoing can be enabled by opening or closing semiconductor switches 506 or 508 (e.g., as controlled by microcontroller 134).

Figure 6:
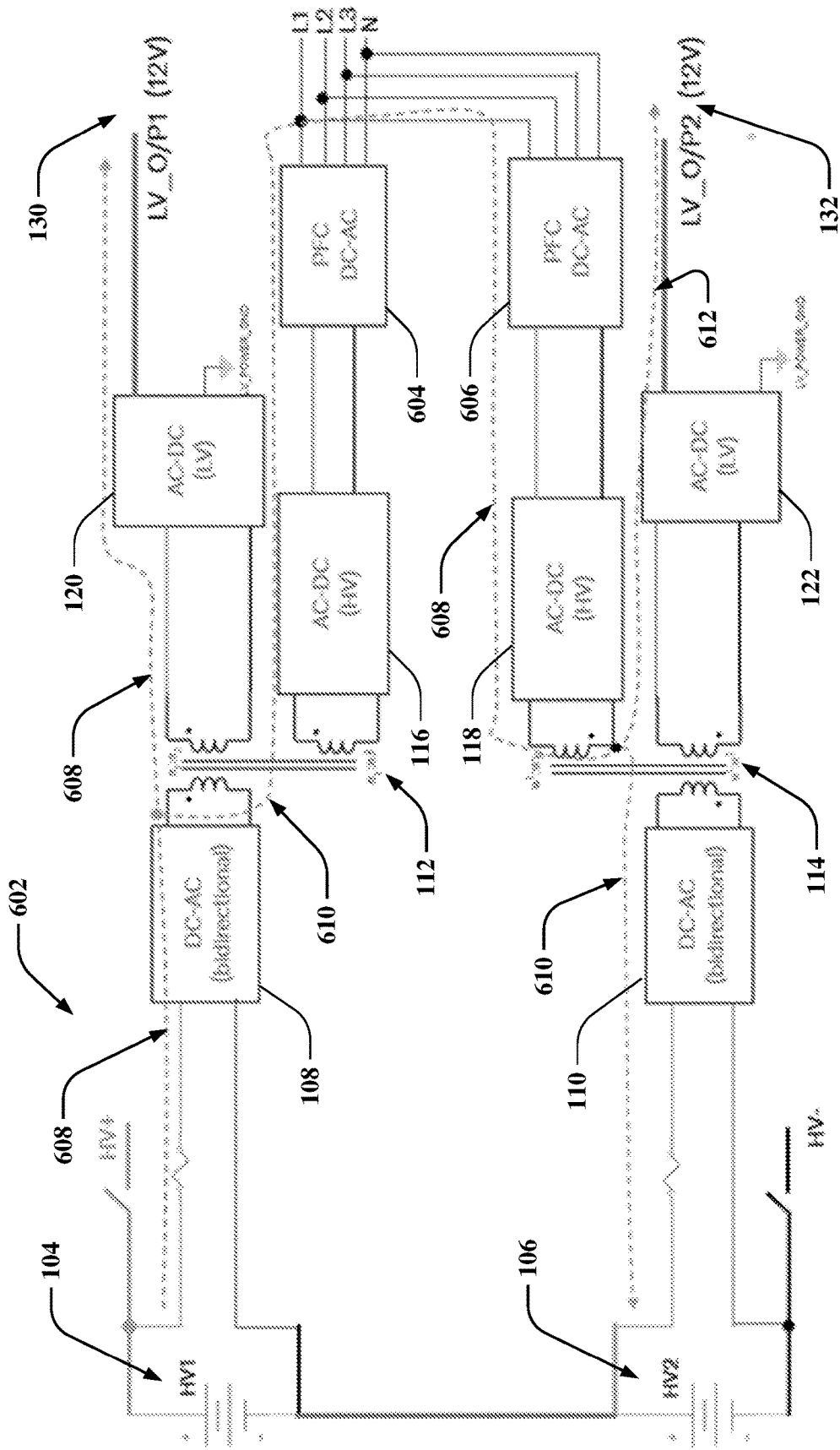
FIG. 6 illustrates a block diagram of an example, non-limiting split battery balancing system in accordance with one or more embodiments described herein.

FIG. 6 illustrates a block diagram of an example, non-limiting split battery balancing system 602 in accordance with one or more embodiments described herein. In various embodiments, the split battery balancing system 602 can comprise an on-board charger and DC-DC converter architecture. The split battery balancing system 602 can comprise HV1 104, HV2 106, bidirectional DC-AC converter 108, bidirectional DC-AC converter 110, transformer 112, transformer 114, bidirectional HV AC-DC converter 116, bidirectional HV AC-DC converter 118, bidirectional LV AC-DC converter 120, bidirectional LV AC-DC converter 122, LV output 130, and/or LV output 132. Repetitive description of like elements and/or processes employed in respective embodiments is omitted for sake of brevity. The split battery balancing system 602 can additionally comprise PFC DC-AC module 604 and/or PFC DC-AC module 606.

In an embodiment, balancing can be performed by splitting the PFC stage into two halves, as shown in FIG. 6 (e.g., top half of FIG. 6 and lower half of FIG. 6, comprising respective PFC DC-AC module 604 or PFC DC-AC module 606). In this regard, semiconductor switches between PFC and AC-DC conversion blocks (e.g., as utilized in split battery balancing system 502) can be omitted in split battery balancing system 602, and efficiency during charging can be improved. According to an example, if HV2 106 voltage is higher than HV1 104 voltage, power from the HV1 104 battery can be circulated into HV2 106 (e.g., via flow paths 608 and 610) and LV output 132 (e.g., via flow paths 608 and 612) by utilizing bi-directional PFC stages (e.g., 604 and 606) respectively connected to each HV AC-DC conversion blocks (e.g., 116 and 118) (e.g., as controlled by microcontroller 134). In this regard, efficiency of charging operations can be improved due to the removal of semiconductor switches between PFC (e.g., 128) and HV AC-DC conversion blocks (e.g., 116 and 118).

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that battery systems and/or respective controllers herein can comprise an artificial intelligence component which can employ an artificial intelligence (AI) model and/or a machine learning (ML) model that can learn to perform the above or below described functions (e.g., via training using historical training data and/or feedback data).

In some embodiments, an artificial intelligence component can comprise an AI and/or ML model that can be trained (e.g., via supervised and/or unsupervised techniques) to perform the above-described functions using historical training data comprising various context conditions that correspond to various battery management operations. In this example, such an AI and/or ML model can further learn (e.g., via supervised and/or unsupervised techniques) to perform the above-described functions using training data comprising feedback data, where such feedback data can be collected and/or stored (e.g., in memory) by an artificial intelligence component. In this example, such feedback data can comprise the various instructions described above/below that can be input to a system herein, over time in response to observed/stored context-based information.

Artificial intelligence components herein can initiate an artificial intelligence-based operation (e.g., using a microcontroller 134) based on a defined level of confidence determined using information (e.g., feedback data). For example, based on learning to perform such functions described above using the above defined feedback data, an artificial intelligence component herein can initiate an operation associated with the vehicle if the vehicle or associated controller or processor determines based on such feedback data, that voltage or charge balancing should occur based on a voltage or charge imbalance between one or more sectors of a battery pack, or between battery packs.

In an embodiment, an artificial intelligence component herein can perform a utility-based analysis that factors cost of initiating the above-described operations versus benefit. In this embodiment, an artificial intelligence component can use one or more additional context conditions to determine whether a battery management action should be taken.

To facilitate the above-described functions, an artificial intelligence component can perform classifications, correlations, inferences, and/or expressions associated with principles of artificial intelligence. In various embodiments, an artificial intelligence component herein can employ an automatic classification system and/or an automatic classification. In one example, an artificial intelligence component can employ a probabilistic and/or statistical-based analysis (e.g., factoring into the analysis utilities and costs) to learn and/or generate inferences. An artificial intelligence component can employ any suitable machine-learning based techniques, statistical-based techniques and/or probabilistic-based techniques. For example, an artificial intelligence component can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, an artificial intelligence component can perform a set of machine-learning computations. In one or more embodiments, an artificial intelligence component can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 7A:
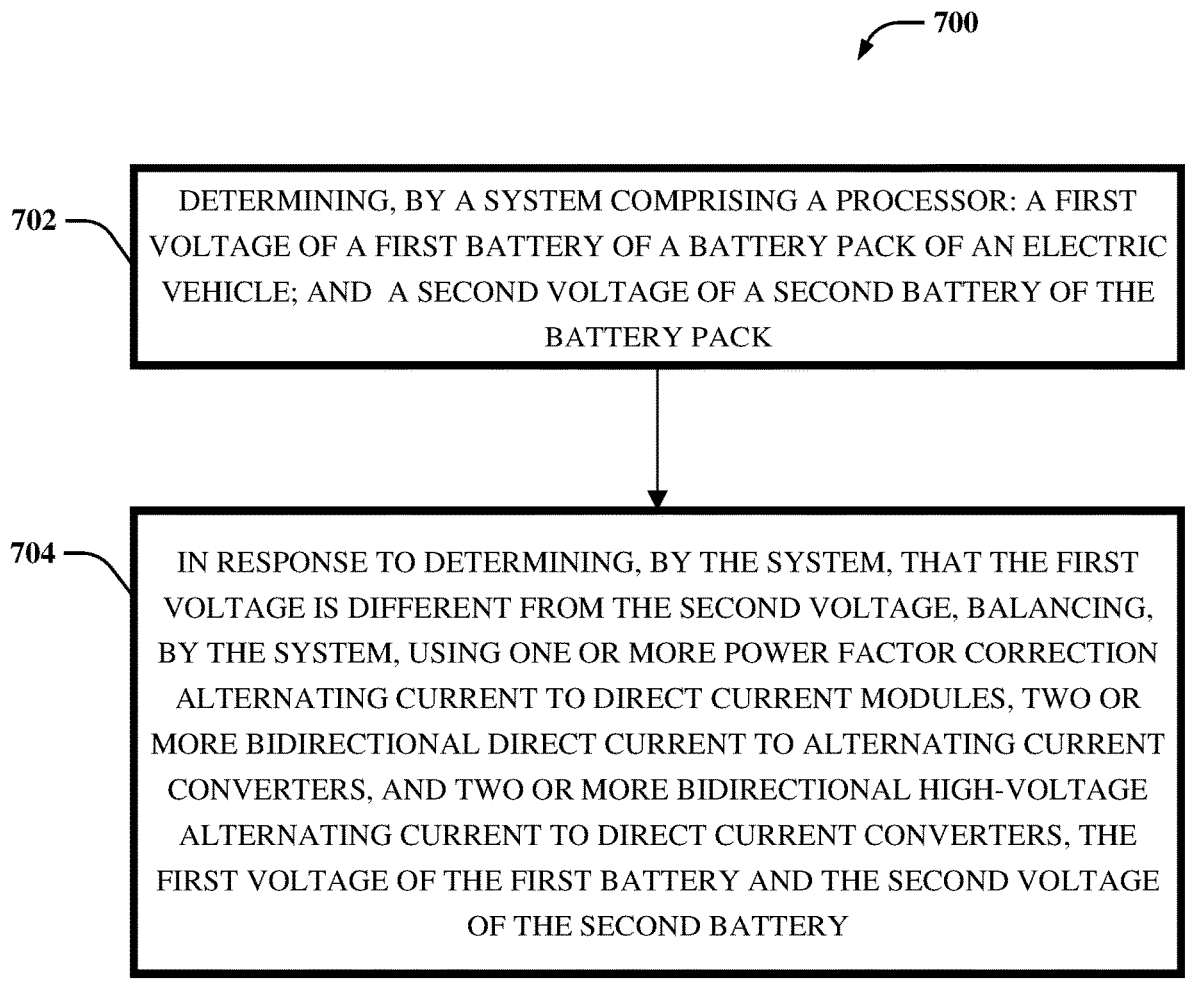
FIGS. 7A and 7B illustrate block flow diagrams of example, non-limiting split battery balancing processes in accordance with one or more embodiments described herein.
Figure 7B:
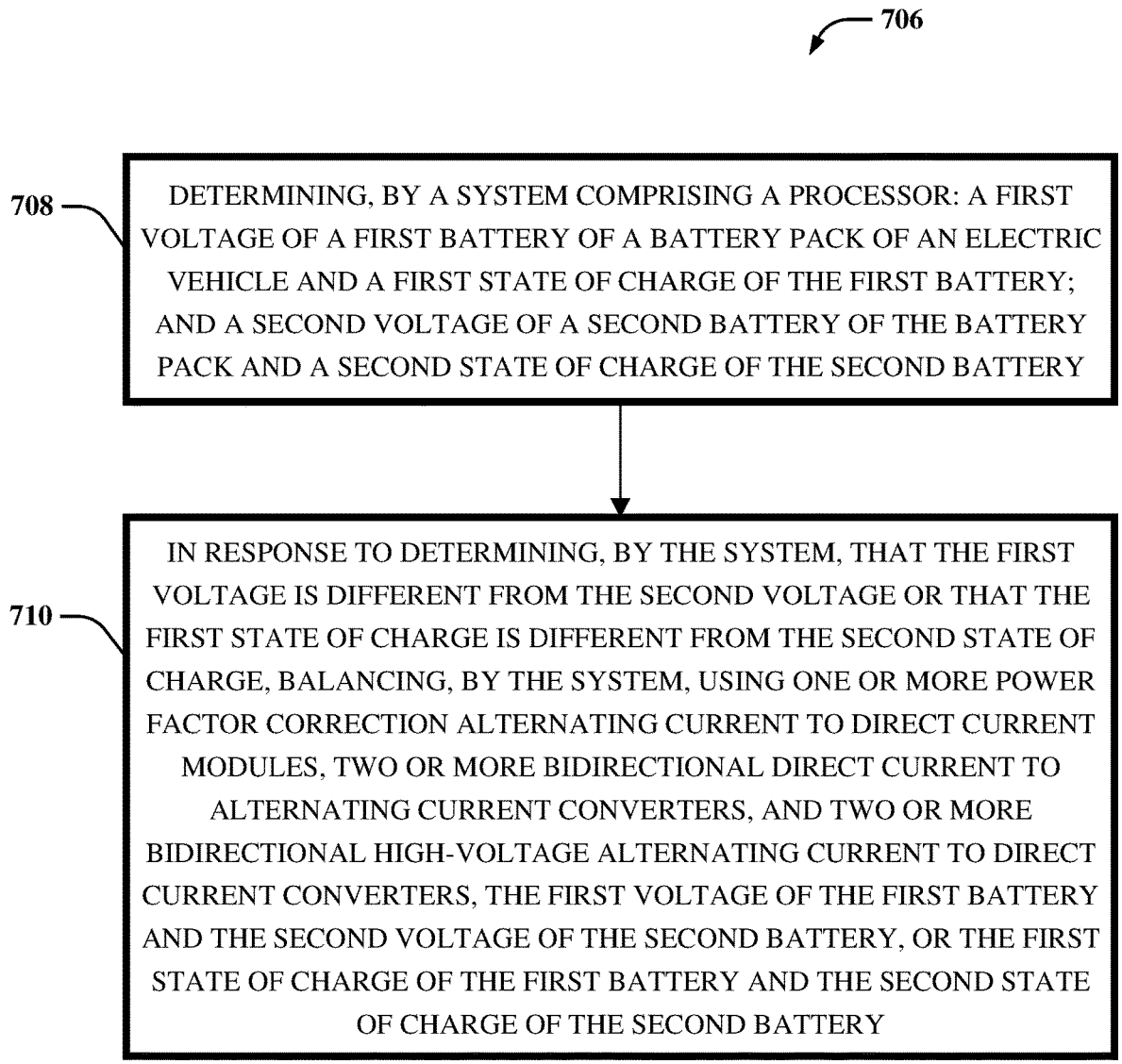

FIGS. 7A and 7B illustrate block flow diagrams of example, non-limiting split battery balancing processes 700 and 706 in accordance with one or more embodiments described herein. Repetitive description of like elements and/or processes employed in respective embodiments is omitted for sake of brevity.

At 702, the process 700 can comprise determining, by a system comprising a processor (e.g., using microcontroller 134), a first voltage of a first battery (e.g., HV1 104) of a battery pack of an electric vehicle; and a second voltage of a second battery (e.g., HV2 106) of the battery pack. At 704, the process 700 can comprise in response to determining, by the system, that the first voltage is different from the second voltage, balancing, by the system, using one or more power factor correction alternating current to direct current modules (e.g., PFC AC-DC module 128, PFC DC-AC module 604, and/or PFC DC-AC module 606), two or more bidirectional direct current to alternating current converters (e.g., bidirectional DC-AC converter 108 or bidirectional DC-AC converter 110), and two or more bidirectional high-voltage alternating current to direct current converters (e.g., bidirectional HV AC-DC converter 116 or bidirectional HV AC-DC converter 118), the first voltage of the first battery and the second voltage of the second battery.

At 708, the process 706 can comprise determining, by a system comprising a processor (e.g., using microcontroller 134), a first voltage of a first battery (e.g., HV1 104) of a battery pack of an electric vehicle and a first state of charge of the first battery; and a second voltage of a second battery (e.g., HV2 106) of the battery pack and a second state of charge of the second battery. At 710, the process 706 can comprise in response to determining, by the system, that the first voltage is different from the second voltage or that the first state of charge is different from the second state of charge, balancing, by the system, using one or more power factor correction alternating current to direct current modules (e.g., PFC AC-DC module 128, PFC DC-AC module 604, and/or PFC DC-AC module 606), two or more bidirectional direct current to alternating current converters (e.g., bidirectional DC-AC converter 108 or bidirectional DC-AC converter 110), and two or more bidirectional high-voltage alternating current to direct current converters (e.g., bidirectional HV AC-DC converter 116 or bidirectional HV AC-DC converter 118), the first voltage of the first battery and the second voltage of the second battery, or the first state of charge of the first battery and the second state of charge of the second battery.

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, systems herein (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, a system herein can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, systems herein can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

Systems herein can comprise one or more computer and/or machine readable, writable, and/or executable components and/or instructions that, when executed by processor (e.g., a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, any component associated with systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments or systems herein and/or any components associated therewith as disclosed herein, can employ a processor to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system herein can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 8:
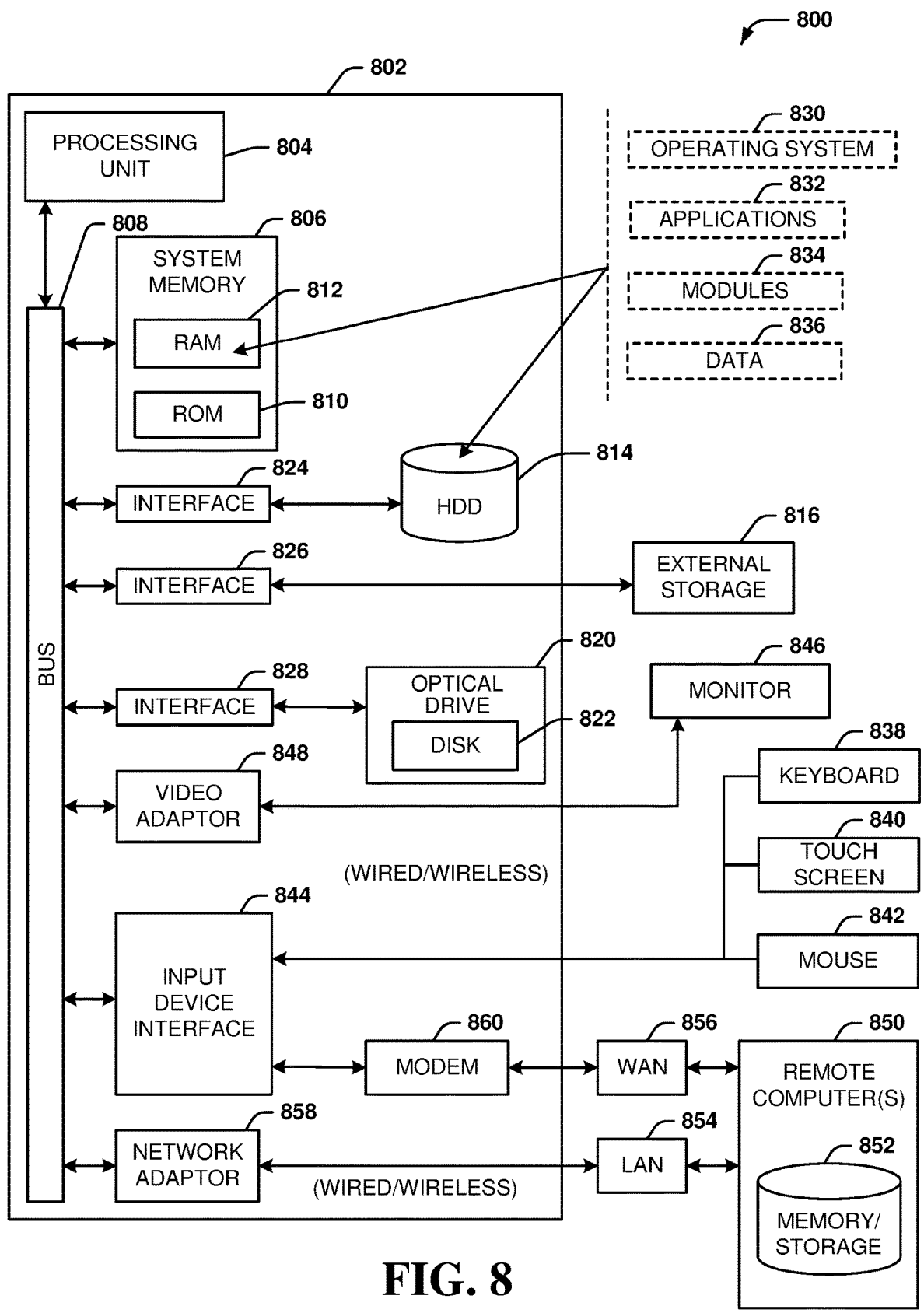
FIG. 8 is an example, non-limiting computing environment in which one or more embodiments described herein can be implemented.

In order to provide additional context for various embodiments described herein, FIG. 8 and the following discussion are intended to provide a brief, general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, etc.). While the internal HDD 814 is illustrated as located within the computer 802, the internal HDD 814 can also be configured for external use in a suitable chassis (not shown). Additionally, while not shown in environment 800, a solid-state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enable with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
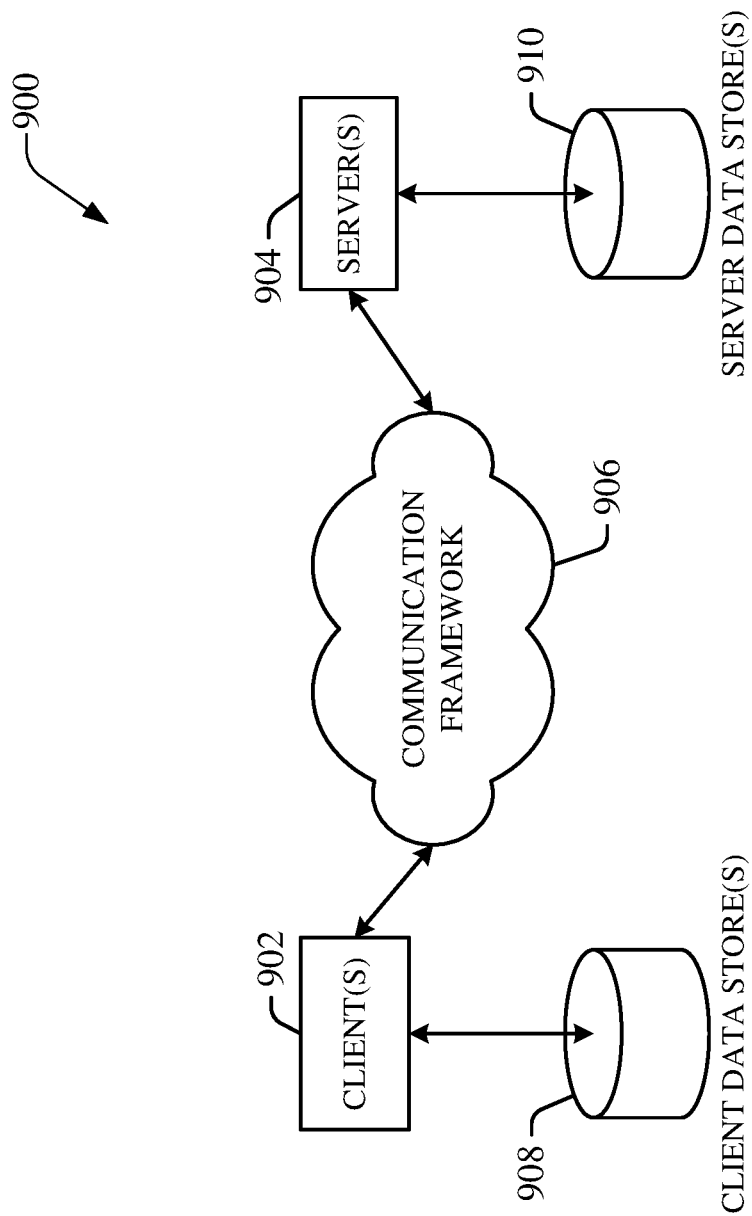
FIG. 9 is an example, non-limiting networking environment in which one or more embodiments described herein can be implemented.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform transformations of media items by employing aspects of this disclosure, for example. One possible communication between a client 902 and a server 904 can be in the form of a data packet adapted to be transmitted between two or more computer processes wherein data packets can include coded analyzed headspaces and/or input. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one exemplary implementation, a client 902 can transfer an encoded file, (e.g., encoded media item), to server 904. Server 904 can store the file, decode the file, or transmit the file to another client 902. It is to be appreciated, that a client 902 can also transfer uncompressed file to a server 904 and server 904 can compress the file and/or transform the file in accordance with this disclosure. Likewise, server 904 can encode information and transmit the information via communication framework 906 to one or more clients 902.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. An electric vehicle battery system, comprising:
    a battery pack comprising a first battery and a second battery;
    a first bidirectional direct current to alternating current (DC-AC) converter electrically coupled to the first battery and to a first bidirectional high-voltage (HV) alternating current to direct current (AC-DC) converter;
    a second bidirectional DC-AC converter coupled to the second battery and to a second bidirectional HV AC-DC converter; and
    a power factor correction AC-DC module electrically coupled to:
        the first bidirectional HV AC-DC converter via a first switch; and
        the second bidirectional HV AC-DC converter via a second switch.

2. The electric vehicle battery system of any preceding clause, wherein the second battery charges the first battery using the first bidirectional HV AC-DC converter and the second bidirectional HV AC-DC converter until a first voltage of the first battery equals a second voltage of the second battery.

3. The electric vehicle battery system of any preceding clause, wherein the second battery is charged from the first battery using the first bidirectional HV AC-DC converter and the second bidirectional HV AC-DC converter.

4. The electric vehicle battery system of any preceding clause, further comprising:
    a first bidirectional low-voltage (LV) AC-DC converter electrically coupled to the first bidirectional DC-AC converter; and
    a second bidirectional LV AC-DC converter electrically coupled to the second bidirectional DC-AC converter.

5. The electric vehicle battery system of any preceding clause, further comprising a first LV output connected to the first bidirectional LV AC-DC converter and a second LV output connected to the second bidirectional LV AC-DC converter, wherein the second battery powers the first LV output using the first bidirectional HV AC-DC converter and the second bidirectional HV AC-DC converter.

6. The electric vehicle battery system of any preceding clause, wherein the first battery powers the second LV output using the first bidirectional HV AC-DC converter and the second bidirectional HV AC-DC converter.

7. The electric vehicle battery system of any preceding clause, wherein the first LV output comprises 12 volt (V) or 48V.

8. The electric vehicle battery system of any preceding clause, further comprising:
    a third LV output electrically coupled to:
        the first LV output via a third switch; and
        the second LV output via a fourth switch.

9. The electric vehicle battery system of any preceding clause, wherein the third LV output draws current from the first battery until a first voltage of the first battery equals a second voltage of the second battery.

10. The electric vehicle battery system of any preceding clause, wherein the first switch and the second switch comprise metal-oxide-semiconductor field-effect transistors (MOSFETs) or insulated-gate bipolar transistors (IGBTs).

11. The electric vehicle battery system of any preceding clause, wherein the first battery and the second battery each comprise 400 volt (V) or 200V.

12. The electric vehicle battery system of clause 1 above with any set of combinations of battery systems 2-11 above.

13. An electric vehicle battery system, comprising:
a battery pack comprising a first battery and a second battery;
a first bidirectional direct current to alternating current (DC-AC) converter electrically coupled to the first battery and to a first bidirectional high-voltage (HV) alternating current to direct current (AC-DC) converter;
a second bidirectional DC-AC converter coupled to the second battery and to a second bidirectional HV AC-DC converter;
a first power factor correction (PFC) AC-DC module electrically coupled to the first bidirectional HV AC-DC converter; and
a second PFC AC-DC module electrically coupled to the second bidirectional HV AC-DC converter.

14. The electric vehicle battery system of any preceding clause, wherein the second battery charges the first battery using the first bidirectional HV AC-DC converter and the second bidirectional HV AC-DC converter via the first PFC AC-DC module and the second PFC AC-DC module until a first voltage of the first battery equals a second voltage of the second battery.

15. The electric vehicle battery system of any preceding clause, wherein the first PFC AC-DC module and the second PFC AC-DC module comprise bidirectional PFC stages.

16. The electric vehicle battery system of any preceding clause, further comprising:
a first bidirectional low-voltage (LV) AC-DC converter electrically coupled to the first bidirectional DC-AC converter; and
a second bidirectional LV AC-DC converter electrically coupled to the second bidirectional DC-AC converter.

17. The electric vehicle battery system of any preceding clause, further comprising a first LV output connected to the first bidirectional LV AC-DC converter and a second LV output connected to the second bidirectional LV AC-DC converter, wherein the second battery powers the first LV output using the first bidirectional HV AC-DC converter and the second bidirectional HV AC-DC converter.

18. The electric vehicle battery system of clause 13 above with any set of combinations of battery systems 14-17 above.

19. A method, comprising:
determining, by a system comprising a processor:
a first voltage of a first battery of a battery pack of an electric vehicle; and
a second voltage of a second battery of the battery pack; and
in response to determining, by the system, that the first voltage is different from the second voltage, balancing, by the system, using one or more power factor correction alternating current to direct current modules, two or more bidirectional direct current to alternating current converters, and two or more bidirectional high-voltage alternating current to direct current converters, the first voltage of the first battery and the second voltage of the second battery.

20. The method of any preceding clause, wherein the balancing occurs during charging of the electric vehicle from an external power source.

21. The method of any preceding clause, wherein the balancing occurs during driving of the electric vehicle.

22. The method of any preceding clause, further comprising:
powering, by the system, a low voltage output via the first battery using a bidirectional low voltage alternating current to direct current converter electrically coupled to at least one of the two or more bidirectional alternating current to direct current converters.

23. The method of clause 19 above with any set of combinations of methods 20-22 above.

What is claimed is:

1. An electric vehicle battery system, comprising:
a battery pack comprising a first battery and a second battery;
a first bidirectional direct current to alternating current (DC-AC) converter electrically coupled to: the first battery, a first bidirectional high-voltage (HV) alternating current to direct current (AC-DC) converter, and a first bidirectional low-voltage (LV) AC-DC converter;
a second bidirectional DC-AC converter coupled to: the second battery, a second bidirectional HV AC-DC converter, and a second bidirectional LV AC-DC converter;
a first LV output connected to the first bidirectional LV AC-DC converter, and a second LV output connected to the second bidirectional LV AC-DC converter, wherein the second battery powers the first LV output using the first bidirectional HV AC-DC converter and the second bidirectional HV AC-DC converter; and
a power factor correction AC-DC module electrically coupled to:
the first bidirectional HV AC-DC converter via a first switch; and
the second bidirectional HV AC-DC converter via a second switch.

2. The electric vehicle battery system of claim 1, wherein the second battery charges the first battery using the first bidirectional HV AC-DC converter and the second bidirectional HV AC-DC converter until a first voltage of the first battery equals a second voltage of the second battery.

3. The electric vehicle battery system of claim 1, wherein the second battery is charged from the first battery using the first bidirectional HV AC-DC converter and the second bidirectional HV AC-DC converter.

4. The electric vehicle battery system of claim 1, wherein the first battery powers the second LV output using the first bidirectional HV AC-DC converter and the second bidirectional HV AC-DC converter.

5. The electric vehicle battery system of claim 1, wherein the first LV output comprises 12 volt (V) or 48V.

6. The electric vehicle battery system of claim 1, further comprising:
a third LV output electrically coupled to:
the first LV output via a third switch; and
the second LV output via a fourth switch.

7. The electric vehicle battery system of claim 6, wherein the third LV output draws current from the first battery until a first voltage of the first battery equals a second voltage of the second battery.

8. The electric vehicle battery system of claim 1, wherein the first switch and the second switch comprise metal-oxidesemiconductor field-effect transistors (MOSFETs) or insulated-gate bipolar transistors (IGBTs).

9. The electric vehicle battery system of claim 1, wherein the first battery and the second battery each comprise 400 volt (V) or 200V.

10. A method, comprising:
determining, by a system comprising a processor:
a first voltage of a first battery of a battery pack of an electric vehicle, and
a second voltage of a second battery of the battery pack;
in response to determining, by the system, that the first voltage is different from the second voltage, balancing, by the system, using one or more power factor correction alternating current to direct current (AC-DC) modules, two or more bidirectional direct current to alternating current (DC-AC) converters, and two or more bidirectional high-voltage (HV) AC-DC converters, the first voltage of the first battery and the second voltage of the second battery; and
powering, by the system, a first low-voltage (LV) output via the second battery using a first bidirectional HV AC-DC converter and a second bidirectional HV AC-DC converter of the two or more bidirectional HV AC-DC converters, wherein a first bidirectional LV AC-DC converter is electrically coupled to a first bidirectional DC-AC converter of the two or more bidirectional DC-AC converters, a second bidirectional LV AC-DC converter is electrically coupled to a second bidirectional DC-AC converter of the two or more bidirectional DC-AC converters, the first LV output is connected to the first bidirectional LV AC-DC converter, and a second LV output is connected to the second bidirectional LV AC-DC converter.

11. The method of claim 10, wherein the balancing occurs during charging of the electric vehicle from an external power source.

12. The method of claim 10, wherein the balancing occurs during driving of the electric vehicle.

13. The method of claim 10, further comprising:
powering, by the system, the second LV output via the first battery using the first bidirectional HV AC-DC converter and the second bidirectional HV AC-DC converter.

14. The method of claim 10, wherein the second battery charges the first battery using the first bidirectional HV AC-DC converter and the second bidirectional HV AC-DC converter until the first voltage of the first battery equals the second voltage of the second battery.

15. The method of claim 10, wherein the first battery charges the second battery using the first bidirectional HV AC-DC converter and the second bidirectional HV AC-DC converter until the first voltage of the first battery equals the second voltage of the second battery.

16. The method of claim 10, wherein the first LV output comprises 12 volt (V) or 48V.

17. The method of claim 10, wherein the second LV output comprises 12 volt (V) or 48V.

18. The method of claim 10, further comprising:
electrically coupling, by the system, a third LV output to:
the first LV output via a third switch, and
the second LV output via a fourth switch.

19. The method of claim 18, wherein the third LV output draws current from the first battery until the first voltage of the first battery equals the second voltage of the second battery.

20. The method of claim 18, wherein the third switch and the fourth switch comprise metal-oxide-semiconductor field-effect transistors (MOSFETs) or insulated-gate bipolar transistors (IGBTs).

* * * * *